United States Patent [19]
Leto

[11] 3,914,067
[45] Oct. 21, 1975

[54] TURBINE ENGINE AND ROTOR MOUNTING MEANS

[75] Inventor: Anthony Leto, Franklin Lakes, N.J.

[73] Assignee: Curtiss-Wright Corporation, Wood-Ridge, N.J.

[22] Filed: Nov. 30, 1973

[21] Appl. No.: 420,636

[52] U.S. Cl. .................. 415/212; 415/60; 416/244; 403/343
[51] Int. Cl. ........................ F01d 25/00; F01d 5/30
[58] Field of Search .............. 415/212 A, 112 B, 60; 416/244 A, 244 R; 403/343, 345, 360; 60/39.31, 39.75

[56] References Cited
UNITED STATES PATENTS

| 154,444 | 8/1874 | Bauser | 403/343 |
| 1,510,107 | 9/1924 | Rodriquez | 403/343 |
| 2,689,681 | 9/1954 | Sabatiuk | 415/60 |
| 3,601,501 | 8/1971 | Johnson | 416/244 |
| 3,751,178 | 8/1973 | Paugh | 415/143 |
| 3,801,226 | 4/1974 | Bevan et al. | 416/244 |

FOREIGN PATENTS OR APPLICATIONS

| 3,250 | 3/1915 | United Kingdom | 403/343 |
| 102,293 | 3/1962 | Netherlands | 403/343 |
| 269,605 | 7/1950 | Switzerland | 416/244 |
| 483,460 | 5/1952 | Canada | 60/39.16 |

Primary Examiner—William L. Freeh
Assistant Examiner—L. J. Casaregola
Attorney, Agent, or Firm—Raymond P. Wallace; Victor D. Behn

[57] ABSTRACT

A turbine engine of one or two spools, in which the turbine rotors are threaded to the compressor shafts in the direction of transmitted torque, with the thread torque at least equal to the aerodynamic torque to prevent further tightening, and with the rotors centered and piloted by an interference fit at other portions thereof.

4 Claims, 3 Drawing Figures

TURBINE ENGINE AND ROTOR MOUNTING MEANS

BACKGROUND OF THE INVENTION

This invention relates to turbine engines, and more particularly to the means of mounting the turbine rotors on the compressor shafts. The invention herein described was made in the course of or under a contract or subcontract thereunder with the Department of the Navy.

In the prior art it has been customary to mount turbine rotor disks by providng a large flange at the rear of the compressor shaft, and attaching the rotor disk by a plurality of bolts, usually in combination with dowels or splines, with the bolts and dowels being either axially or radially disposed. This procedure requires expensive manufacturing procedures and results in correspondingly costly parts. Assembly is slow owing to the number of operations, and because of the necessity of having the bolts and dowels matched for weight and disposed in oppositely matched pairs, and the selective fits often necessitated with the dowels.

The present invention obviates many of these machining costs and provides rapid and simple assembly.

SUMMARY

This invention provides a turbine engine of either the one-spool or the two-spool type having the turbine rotor disk attached to the compressor shaft by threaded engagement, the rotor disk being self-centering coaxial with the shaft and being precisely positioned axially by its engagement. The rotor disk can neither tighten further nor loosen in use, but is readily demountable by reversing the threaded engagement.

It is therefore an object of this invention to provide a turbine engine having improved mounting means for the rotor disk.

Another object is to provide a turbine engine having a selfcentering balanced rotor disk.

A further object is the provision of a turbine engine having a rotor disk assembled to the compressor shaft with reduction of the number of parts and assembly time.

Other objects and advantages will become apparent on reading the following specification in connection with the accompanying drawings.

DESCRIPTION OF THE PREFERRED EMBODIMENTS

Figure 1:
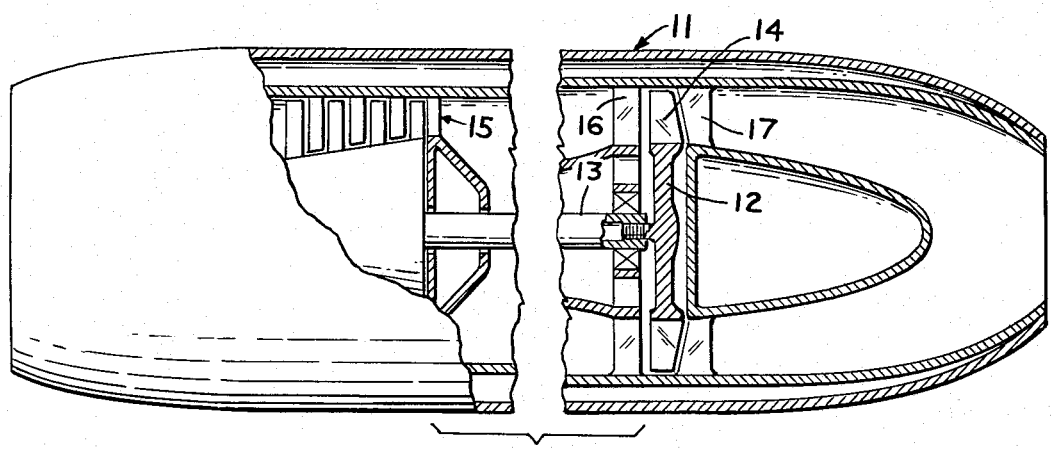
FIG. 1 is an elevation, partially in cross-section, of a turbine engine embodying the invention and showing the positioning of the turbine rotor.

In FIG. 1 there is shown a gas turbine engine 11 of the type used in aircraft. A turbine rotor disk 12 is mounted on a shaft 13 leading forwardly to the compressor 15 and drivingly connected thereto. The rotor disk 12 bears turbine blades 14 mounted around the periphery of the disk and rotatable between guide vanes 16 and exit vanes 17, the turbine rotor being driven by the combustion gases generated in the engine. Other aspects of such an engine, including combustion means, cooling means, sealing means, and other conventional features are omitted from the showing as not being necessary to an understanding of the invention. Although the invention will be described principally in terms of its use in aircraft engines, it is to be understood that it is also applicable to other turbine engines, such as power turbines.

Figure 2:
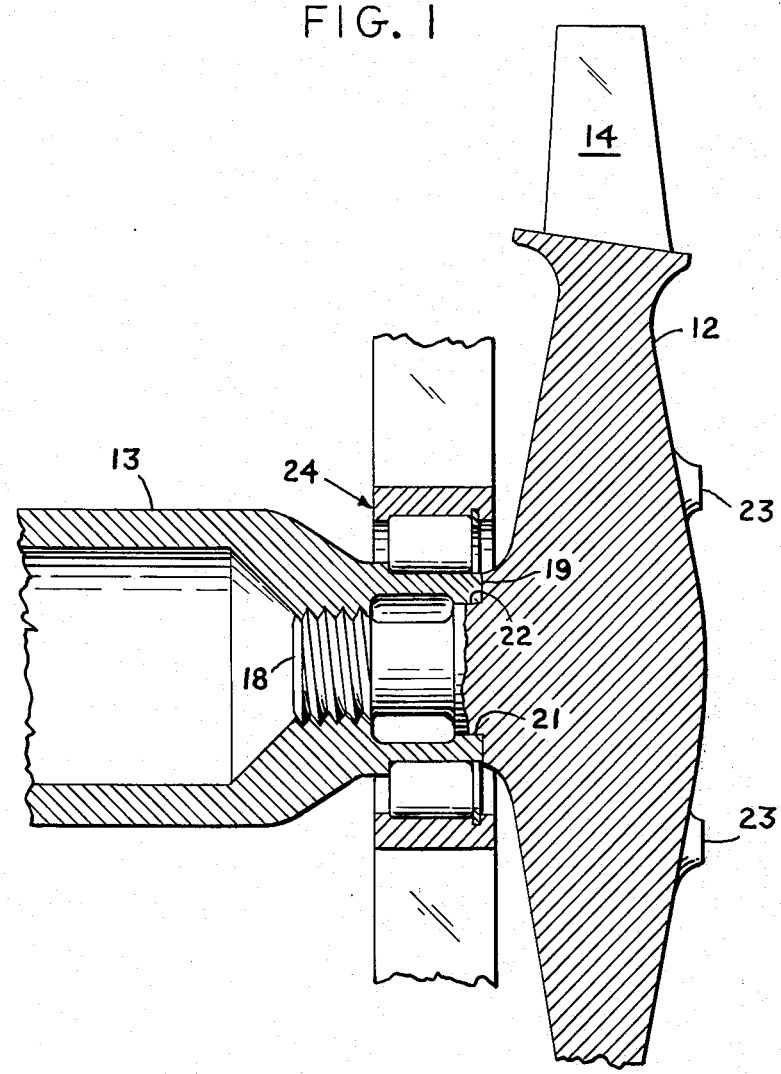
FIG. 2 is a fragmentary cross-section showing the attachment of the rotor disk to the compressor shaft of a single-spool engine.

FIG. 2 shows a portion of a rotor disk 12 drivingly attached to a compressor shaft 13, which may be tubular as shown or may be solid, but in any case will have a sufficient coaxial internal cavity at its downstream end to accept the elements to be described. The forward or upstream side of the rotor disk has a forwardly extending hub portion 18, the foremost end portion of the hub having a male thread thereon. The shaft 13 has in its internal cavity a mating female thread disposed somewhat forward of its downstream end and in proper axial position so that the male thread of the hub is fully engaged therewith.

The downstream end of shaft 13 has a plane face 19 transverse to the axis, against which is seated a parallel mating plane face of the rotor disk to provide suitable axial positioning of the rotor when the threads of both parts are fully engaged. The downstream end of the shaft has a bored portion 21 adjacent to the plane face 19, the bore 21 having an internal diameter somewhat larger than the major diameter of the threaded portion of the hub, so that the threaded portion of the hub will readily pass through bore 21 of the shaft. However, the hub has a portion 22 extending forwardly from the plane face, which portion 22 is of such external diameter as to provide a piloting interference fit with internal diameter 21 of the shaft. Both the bore 21 and the interfering hub portion 22 are coaxial with the shaft and the rotor disk, so that when the disk and shaft are assembled and the threaded engagement is fully torqued up until the plane face of the rotor is seated against the plane face of the shaft the two parts are automatically coaxially positioned.

Means may be provided on the rotor disk for tightening the threaded attachment, such as lugs 23 shown on the downstream face of the disk, or spanner apertures or other convenient means.

A bearing 24 is shown supporting the end of the shaft, but it is to be understood that the bearing may be located elsewhere, such as at the downstream side of the rotor disk, and that the bearing may be of any suitable type.

Figure 3:
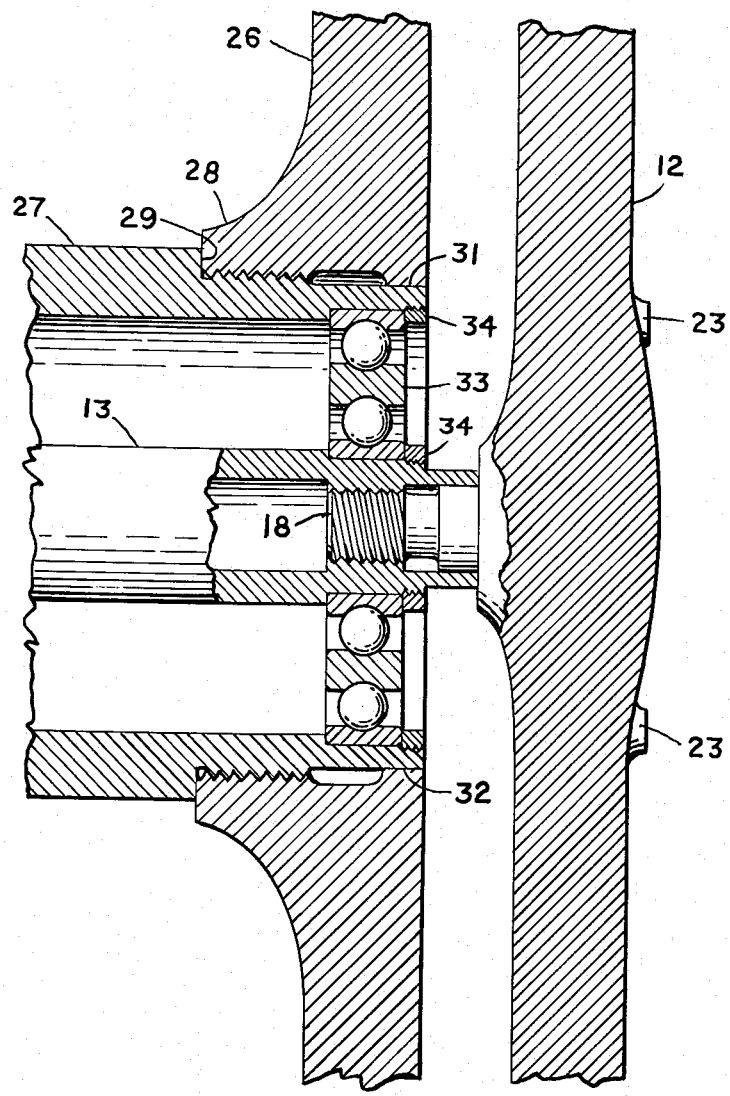
FIG. 3 is a similar fragmentary cross-section showing the attachment of the rotor disks in a double-spool engine.

In FIG. 3 there is shown the application of the invention to a two-spool engine. In this case the rotor 12 is the downstream or low-pressure rotor, but it and its shaft 13 and its attachment thereto are the same as previously described.

The high-pressure rotor 26 is secured to the hollow shaft 27, surrounding shaft 13, by application of the technique described above. Rotor disk 26 has a forwardly extending hub 28 having an internal thread engaged with an external thread on shaft 27. The upstream face of hub 28 has a plane surface transverse to the axis, which seats against the plane face of a sholder 29 on the exterior of shaft 27 when the two parts are fully engaged, positioning the rotor axially. The downstream end of tubular shaft 27 has an external diameter 31 sufficiently reduced that the threaded portion of the rotor hub 28 will easily pass it, and the disk at its downstream side has an internal diameter 32 of such dimension as to provide an interference fit with shaft diameter 31. A double-race or other suitable bearing 33 may be provided inside the shaft 27, positioned by any suitable retaining means, such as threaded rings 34.

If the heat flux of the engine is such that there is a possibility of the engagement of diameters 31 and 32 loosening from thermal growth, the disk 26 may extend slightly downstream from the end of shaft 27 and have an internal annulus receiving the end of the shaft, with the interference engagement being the internal diameter of the shaft with a forwardly extending portion of the disk. Also, if the bearing 33 is omitted or otherwise located, disk 26 may be attached to shaft 27 in exactly the same manner as disk 12 and shaft 13. That is, disk 26 will have a forwardly extending tubular hub 28 bearing male threads on its exterior diameter, and will surround shaft 13 and be threaded to the internal diameter of shaft 27. The piloting interference fit will be provided by an outer diameter on the hub adjacent to the disk, fitting into the internal diameter of shaft 27, and axial positioning will be provided by a plane face on the disk seating against the plane face of the end of the shaft.

For either of the shafts and rotors shown the thread may be either right-hand or left-hand, depending on the direction of engine rotation, that is, the threads will be in the direction of the aerodynamic torque on the rotors so that the rotors would tend to tighten during engine operation. However, at assembly the two mating elements are tightened to a torque limit at least equal to, and preferably greater than, the maximum aerodynamic torque on the rotor during operation, thus preventing any further tightening from occurring. This is important for maintaining balance of the rotating assembly. After manufacture of the parts, the compressor, shaft, and turbine rotor are assembled into a unit with the rotor torqued to the shaft to a value at least as great as the aerodynamic torque in the engine. The whole unit is then carefully balanced both statically and dynamically, and the rotor and shaft marked with suitable indicia so that they can be restored to precisely the same relationship. Thereupon the rotating unit is disassembled, and reassembled into the engine with the other components, returning the rotor to the same torque and angular relationship with the shaft so that the rotating unit will retain its balance in the engine. If the rotor were to tighten further during operation its relationship to the compressor would be disrupted.

In operation of the engine, if a blade or a group of blades should rub against the blade shroud, the loosening torque thus produced will not equal the accelerating torque of the engine, and since the initial torque between the rotor and the shaft is at least as great as the maximum torque which will arise, there is no possibility of the disk loosening owing to blade rubbing.

The attachment of the disk and rotor being in each case near the center of the disk, rather than at the large diameters of the prior art, and the rotor hub being forwardly extended away from the main mass of the disk, the juncture is insensitive to temperature gradients and elastic growth resulting from either strain or thermal influence. Therefore the rotor maintains a better balance with less vibration at high speeds than rotors of the prior art with attachments positioned at greater radial proportions.

Lowered costs are possible with this invention, since the expensive splines, close-fitting dowels, and other special machining operations of the prior art are avoided. Assembly and disassembly are rapid and easy and require no special and costly locking provisions. Further, interchangeability of parts is achieved since no selective fits with mating parts are required.

What is claimed is:

1. A gas turbine engine having a compressor, at least one turbine rotor having a bladed portion around the periphery thereof, the rotor receiving thermal input at the bladed portion during engine operation, and at least one shaft driven by the turbine rotor and driving the compressor, wherein the improvement comprises:
   a. unitary rotor-retaining and torque-transmitting means coupling the rotor to the shaft and comprising a threaded portion of the shaft and a threaded portion of the rotor engaged therewith, the threaded portions being threaded in the direction of tightening with rotation of the rotor during engine operation, the rotor and compressor being in dynamic balance and the coupling means being under a state of torque at least equal to the aerodynamic torque on the rotor during engine operation so that no further tightening occurs during engine operation and accidental friction of the rotor against stationary engine portions does not cause alteration of angular relationships and dynamic balance;
   b. the shaft having a plane surface normal to the axis thereof and the rotor having a plane surface parallel to the plane of rotor rotation, the rotor plane surface abutting the shaft plane surface when the threaded portions of the rotor are fully engaged to position the rotor in the axial direction and to maintain its plane of rotation normal to the axis of the shaft;
   c. the shaft having a diametral portion coaxial with the shaft and the rotor having a diametral portion coaxial with the rotor, the shaft and rotor diametral portions being mutually engaged in interference fit so that the rotor is self-centering with the shaft and in dynamic balance, the interference being such that it will not loosen from thermal expansion during thermal input to the rotor; and
   d. the threaded portions and the portions in interference fit being disposed relatively remote from the bladed portion of the rotor and thereby relatively insensitive to thermal input at the bladed portion.

2. The combination recited in claim 1, wherein the shaft has an internal coaxial threaded portion relatively close to the axis of rotation and adjacent to the rotor end thereof, and the rotor has a coaxial hub portion extending forwardly from the plane of rotation of the rotor, the hub portion having an external thread thereon relatively close to the axis of rotation and relatively remote from the thermal input of the bladed portion, the external thread on the hub portion being engaged with the internal thread of the shaft.

3. The combination recited in claim 1, wherein the shaft has an external coaxial threaded portion relatively close to the axis of rotation and adjacent to the rotor end thereof, and the rotor has a coaxial sleeve hub portion extending forwardly from the plane of rotation of the rotor, the sleeve hub portion having an internal thread relatively close to the axis of rotation and relatively remote from the thermal input of the bladed portion, the internal thread of the sleeve hub portion being engaged with the external thread of the shaft.

4. The combination recited in claim 1, wherein there are two concentric shafts and two rotors, with one rotor threadably engaged with each shaft.

* * * * *